United States Patent
Crighton et al.

(10) Patent No.: US 11,023,305 B2
(45) Date of Patent: Jun. 1, 2021

(54) OBTAINING DIAGNOSTIC INFORMATION

(71) Applicant: INTERNATIONAL BUSINESS MACHINES CORPORATION, Armonk, NY (US)

(72) Inventors: David J. Crighton, Horton Heath (GB); Martin R. Naish, Newbury (GB); David Robert Coles, Hants (GB); Paul J. Lacy, Havant (GB); Kirstine F. L. Clapperton, Fordingbridge (GB)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 16/201,261

(22) Filed: Nov. 27, 2018

(65) Prior Publication Data
US 2020/0167217 A1    May 28, 2020

(51) Int. Cl.
*G06F 11/00* (2006.01)
*G06F 11/07* (2006.01)

(52) U.S. Cl.
CPC ........ *G06F 11/079* (2013.01); *G06F 11/0721* (2013.01); *G06F 11/0751* (2013.01); *G06F 11/0778* (2013.01)

(58) Field of Classification Search
CPC ............. G06F 11/0721; G06F 11/0751; G06F 11/0778; G06F 11/079
See application file for complete search history.

(56) References Cited

U.S. PATENT DOCUMENTS

| | | | |
|---|---|---|---|
| 6,343,236 B1 | 1/2002 | Gibson et al. | |
| 7,120,685 B2 | 10/2006 | Ullmann et al. | |
| 7,493,527 B2 | 2/2009 | Garza et al. | |
| 7,661,094 B2 | 2/2010 | Blevin et al. | |
| 7,930,590 B2 | 4/2011 | Cheng et al. | |
| 8,140,911 B2 | 3/2012 | Borghetti et al. | |
| 8,181,161 B2 | 5/2012 | Kollmann et al. | |
| 9,311,220 B1* | 4/2016 | Ha ..................... | G06F 11/3636 |
| 9,727,407 B2 | 8/2017 | Ruan et al. | |
| 2005/0138471 A1 | 6/2005 | Okbay et al. | |
| 2005/0289404 A1* | 12/2005 | Maguire ............. | G06F 11/0781 714/57 |
| 2010/0095157 A1* | 4/2010 | Aoyama ............. | G06F 11/0751 714/37 |
| 2011/0067008 A1 | 3/2011 | Srivastava et al. | |
| 2012/0215907 A1 | 8/2012 | Chung | |

(Continued)

OTHER PUBLICATIONS

Microsoft Azure, "Enable diagnostics logging for web apps in Azure App Service" Jun. 5, 2016, 10 pages.

(Continued)

*Primary Examiner* — Joshua P Lottich
(74) *Attorney, Agent, or Firm* — Robert D. Bean

(57) ABSTRACT

Concepts for logging and retrieving diagnostic information relating to a computer system that implements a runtime stack when executing a program are presented. One example comprises, determining a depth value, the depth value being configured to identify a level of diagnostic tracing for the runtime stack. For each stack frame of the runtime stack: the depth value is compared with a counter value associated with the stack frame, and data is then retrieved from the stack frame based on the comparison result.

17 Claims, 5 Drawing Sheets

(56) References Cited

U.S. PATENT DOCUMENTS

| | | | |
|---|---|---|---|
| 2013/0326326 A1* | 12/2013 | Greer | G06F 3/0484 |
| | | | 715/230 |
| 2014/0237454 A1 | 8/2014 | Delporte | |
| 2015/0347272 A1* | 12/2015 | Berk | G06F 11/3636 |
| | | | 717/128 |
| 2016/0085657 A1* | 3/2016 | Braun | G06F 11/302 |
| | | | 714/38.11 |

OTHER PUBLICATIONS

Microsoft Technet, "Using diagnostic logging", © 2018, 18 pages.

Disclosed Anonymously, "Determining appropriate trace string from exception stack to catch trace of second failure", An IP.com Prior Art Database Technical Disclosure, IP.com No. IPCOM000233181D, IP.com Electronic Publication Date: Nov. 28, 2013, 3 pages.

Disclosed Anonymously, "Repeatable Failure Data Capture—Framework to aid in Root Cause Analysis", An IP.com Prior Art Database Technical Disclosure, IP.com No. IPCOM000238007D, IP.com Electronic Publication Date: Jul. 25, 2014, 3 pages.

\* cited by examiner

OBTAINING DIAGNOSTIC INFORMATION

BACKGROUND

The present invention relates generally to the field of logging and obtaining diagnostic information relating to a computer system.

The present invention also relates to a computer program product comprising computer-readable program code that enables a processor of a system to implement such methods.

The present invention further relates to a system for logging and obtaining diagnostic information relating to a computer system.

Modern computer programs implemented in computer systems often have to manage multiple functions (or tasks) in the execution of a single computer program. Accordingly, in a complex computer program, some errors or problems may result from timing windows being missed, some of which can be extremely small. Even when running in a parallel environment with a high transactional workload, such timing windows can cause production failures.

It can be difficult to diagnose the cause(s) of errors or problems, because a timing window may be difficult to hit in a test environment for example. Additionally, or alternatively, a timing window may depend on other environmental factors relating to the actual machine observing the problem.

When diagnosing a problem that cannot be reproduced, it is standard practice to rely on diagnostic tracing or logging in order to fix the error/problem. However, with an error/problem that is caused by a small timing window, just the act of turning on diagnostic logging or tracing can cause the problem to no longer happen (i.e. prevent reoccurrence of the error/problem). Also, a volume of diagnostic information can be extremely large, making it difficult for a support engineer to find pertinent information in a trace.

Diagnostic logging often entails the use of tracing functions, such as TraceEntryFunction and TraceExitFunction, which are methods, procedures or macros with the purpose of logging diagnostic information to trace that is coincident with the entry to a specific function, method or module such that an engineer reading the trace can infer that entries occurring after the output from the TraceEntryFunction in a trace log but before the TraceExitFunction occur during the time that the specific function is on the call stack. The function may either log directly to disk or through an indirect buffered logging system and may include additional options for logging of arguments or other data useful for problem determination. The function may also include facility for formatting the output in order to make the resulting logs easier to read, for example by providing indenting based on entry/exit to functions.

SUMMARY

The present invention seeks to provide a computer-implemented method for logging diagnostic information relating to a computer system that implements a runtime stack when executing a program.

The present invention further seeks to provide a computer-implemented method for obtaining diagnostic information relating to a computer system that implements a runtime stack when executing a program.

The present invention also seeks to provide a computer program product including computer program code for implementing a proposed method when executed by a processing unit.

The present invention also seeks to provide a processing system adapted to execute the computer program code.

The present invention also seeks to provide a system for logging diagnostic information relating to a computer system that implements a runtime stack when executing a program.

The preset invention yet further seeks to provide a system for obtaining diagnostic information relating to a computer system that implements a runtime stack when executing a program.

According to an aspect of the present invention, there is provided a computer-implemented method for logging diagnostic information relating to a computer system that implements a runtime stack when executing a program. The method comprises defining a counter value, the counter value being configured to identify a level of diagnostic tracing for the runtime stack. The method also comprises: in response to a tracing entry function being invoked, incrementing the counter value, and in response to a tracing exit function being invoked, decrementing the counter value. The method further comprises, in response to a new stack frame being added to the runtime stack, associating a current value of the counter value with the new stack frame.

According to another aspect of the present invention there is provided a computer-implemented method for obtaining diagnostic information relating to a computer system that implements a runtime stack when executing a program. The method comprises determining a depth value, the depth value being configured to identify a level of diagnostic tracing for the runtime stack. The method also comprises, for each stack frame of the runtime stack: comparing the depth value with a counter value associated with the stack frame; and retrieving data from the stack frame based on the comparison result.

According to another aspect of the invention, there is provided a computer program product for logging diagnostic information relating to a computer system that implements a runtime stack when executing a program. The computer program product comprises a computer readable storage medium having program instructions embodied therewith, the program instructions executable by a processing unit to cause the processing unit to perform a method according to a proposed embodiment.

According to yet another aspect of the invention, there is provided a computer program product for obtaining diagnostic information relating to a computer system that implements a runtime stack when executing a program. The computer program product comprises a computer readable storage medium having program instructions embodied therewith, the program instructions executable by a processing unit to cause the processing unit to perform a method according to a proposed embodiment.

According to another aspect of the invention, there is provided a processing system comprising at least one processor and the computer program product according to an embodiment. The at least one processor is adapted to execute the computer program code of said computer program product.

According to yet another aspect of the invention, there is provided a system for logging diagnostic information relating to a computer system that implements a runtime stack when executing a program. The system comprises a counter component configured to define a counter value, the counter value being configured to identify a level of diagnostic tracing for the runtime stack. The system also comprises a count modifier unit configured, in response to a tracing entry function being invoked, to increment the counter value, and, in response to a tracing exit function being invoked, to decrement the counter value. The system yet further comprises an association component configured, in response to a new stack frame being added to the runtime stack, to associate a current value of the counter value with the new stack frame.

According to another aspect of the invention, there is provided a system for obtaining diagnostic information relating to a computer system that implements a runtime stack when executing a program. The system comprises a depth value component configured to determine a depth value, the depth value being configured to identify a level of diagnostic tracing for the runtime stack. The system also comprises a data retrieval component configured, for each stack frame of the runtime stack, to compare the depth value with a counter value associated with the stack frame, and to retrieve data from the stack frame based on the comparison result.

BRIEF DESCRIPTION OF THE DRAWINGS

Preferred embodiments of the present invention will now be described, by way of example only, with reference to the following drawings, in which.

DETAILED DESCRIPTION

Figure 1:
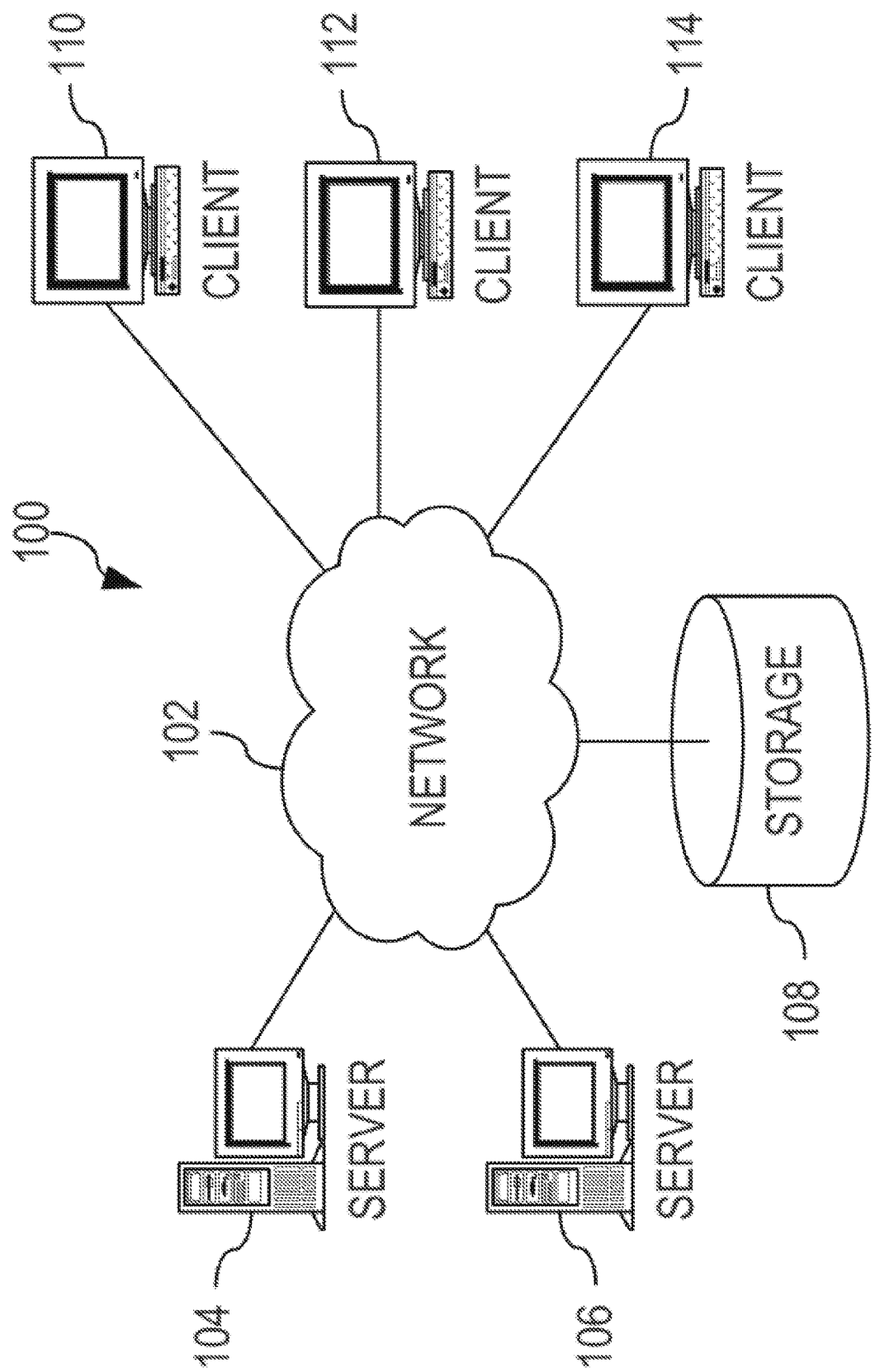
FIG. 1 depicts a pictorial representation of an example distributed system in which aspects of the illustrative embodiments may be implemented.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Proposed are concepts that may be useful for generating and obtaining diagnostic information for a computer system that implements a runtime stack when executing a program. By identifying levels of diagnostic tracing for the runtime stack, different levels of information or detail may be provided so that a trace may be optimized. Accordingly, proposed embodiments may provide useful information for diagnostic purposes whilst prevent the provision of too little or too much information.

Tools or concepts for enabling improved diagnosis or debugging of computer program functions may therefore be provided by proposed embodiments. Embodiments may cater for different levels of detail in a trace system through the provision of extended tracing context concepts that identify the context in which tracing functions are invoked.

By way of example, proposed embodiments may maintain a counter value for the purpose of creating information about a tracing context. Such a counter value may be incremented or decremented when a tracing function is entered or exited, respectively. In this way, a counter value may identify a level of diagnostic tracing for the runtime stack, and may therefore be thought of as a tracing level identifier that can be associated with each stack frame. For instance, when a new stack frame is added to the runtime stack, a current value of the counter value may be associated with the new stack frame.

Furthermore, proposed embodiments may facilitate the provision of an optimized level of detail for a trace by leveraging the counter value information (i.e. tracing context information). For instance, context provided by the counter value information may be used to dynamically alter a level of detail, either globally or locally, to a given call stack so that the amount of trace information is optimized (e.g. for cases where tracing a problem causes the problem to no longer occur).

By way of example, embodiments may allow the calculation of a trace call itself to be avoided during times when the trace is off, not just the write to log. Additionally, embodiments may dynamically adapt to the area of code being worked on, producing maximal or minimal detail (depending on configuration or choice for example) without requiring categorization of the trace detail levels.

Accordingly, requirements involving manager components may be avoided or alleviated by proposed embodiments.

Reference to a runtime stack is to be taken to refer to the known concept of a stack data structure that stores information about the active subroutines (or functions) of a computer program. A runtime stack may also be known as an execution stack, program stack, control stack, or machine stack. It may often be shortened to just "the stack". Details of the runtime stack are normally hidden and automatic in high-level programming languages. Thus, instruction sets may be employed which provide special instructions for manipulating stacks.

Embodiments may be thought of capturing information about a level of diagnostic tracing and then enabling the leverage of this information to assist the retrieval of diagnostic information at an optimized or appropriate level of detail. This may be used to avoid collecting trace for areas that do not need to be examined in order to resolve the defect. This may vastly reduce an amount of analysis that a support engineer needs to do in order to resolve a defect.

Embodiments may therefore provide concepts that facilitate the efficient and effective provision of trace information. Such concepts may be based on associating an identifier of a level of diagnostic tracing with stack frame of the runtime stack.

By way of further example, embodiments may propose extensions to existing computer systems and/or diagnostic systems. Such extensions may enable the provision of additional information by leveraging proposed concepts. In this way, a conventional computer system or diagnostic system may be upgraded by implementing or 'retro-fitting' a proposed embodiment.

Proposed embodiments may overcome shortcomings of existing diagnosis or debugging concepts which provide excessive information (e.g. due to requiring the collection of trace for areas that do not need to be examined).

Illustrative embodiments may provide concepts for logging and obtaining context information regarding levels of diagnostic tracing, and such concepts may cater for the dynamic adjustment of tracing detail. Dynamic information logging and diagnostic concepts may therefore be provided by proposed embodiments.

Modifications and additional steps to a traditional diagnostic system may also be proposed which may enhance the value and utility of the proposed concepts.

Embodiments may further comprise storing the counter value in a data storage component. In this way, a current value of the counter value may be maintained (and subsequently retrieved when required).

Some embodiments may further comprise, in response to a tracing entry function being invoked, storing an identifier of the tracing function at the top of a tracing stack associated with the runtime stack. Further, in response to a tracing exit function being invoked, the identifier of the tracing function may be removed from the tracing stack associated with the runtime stack. In this way, embodiments, may maintain a stack of method names A trace entry function may then cause placement of the current method name on the top of the stack and the trace exit function may pop an entry from the top of the stack. When an error is thrown, the trace context may be examined and the current stack depth and current stack recorded. This approach may facilitate dynamic algorithms that attempt to maximize or minimize the trace with respect to a failure point.

Exemplary embodiments of a method for obtaining diagnostic information may comprise: determining a depth value, the depth value being configured to identify a level of diagnostic tracing for the runtime stack. The method may also comprise, for each stack frame of the runtime stack: comparing the depth value with a counter value associated with the stack frame; and retrieving data from the stack frame based on the comparison result.

By way of example, determining a depth value may comprise defining a depth value based on a user input indicative of a diagnostic tracing.

In some embodiments, determining a depth value may comprise: determining, for the runtime stack, the largest value of a counter value associated a stack frame of the runtime stack; defining the depth value to be equal to the determined largest value of a counter value; executing a tracing function on the computer system; and, in response to no error or problem occurring within a diagnostic time window during execution of the tracing function, decrementing the depth value. This approach may generate the maximum amount of trace while allowing the minimum number of production failures to occur, for example.

In another embodiment, determining a depth value may comprise: determining, for the runtime stack, the smallest value of a counter value associated a stack frame of the runtime stack; defining the depth value to be equal to the determined smallest value of a counter value; executing a tracing function on the computer system; and in response to an error or problem occurring within a diagnostic time window during execution of the tracing function, incrementing the depth value. This approach may therefore be thought of as being opposite to the approach of the preceding paragraph.

Some embodiments may further comprise: in response to an error or problem occurring during execution of a program, comparing a tracing entry function with an identifier of a tracing function at the top of a tracing stack associated with the runtime stack; and retrieving data from the stack frame based on the result of comparing.

Further, retrieving data from the stack frame based on the result of comparing may comprise: if the tracing entry function matches an identifier of a tracing function at the top of a tracing stack associated with the runtime stack, retrieving data from the stack frame; and if the tracing entry function does not match an identifier of a tracing function at the top of a tracing stack associated with the runtime stack, incrementing the depth value.

In some embodiments, the diagnostic time window may be determined based on at least one of: a user input; an error message generated by the system; and an expected error or problem. In this way, embodiments may be dynamically adjusted (e.g. automatically and/or in response to user requirements).

Figure 2:
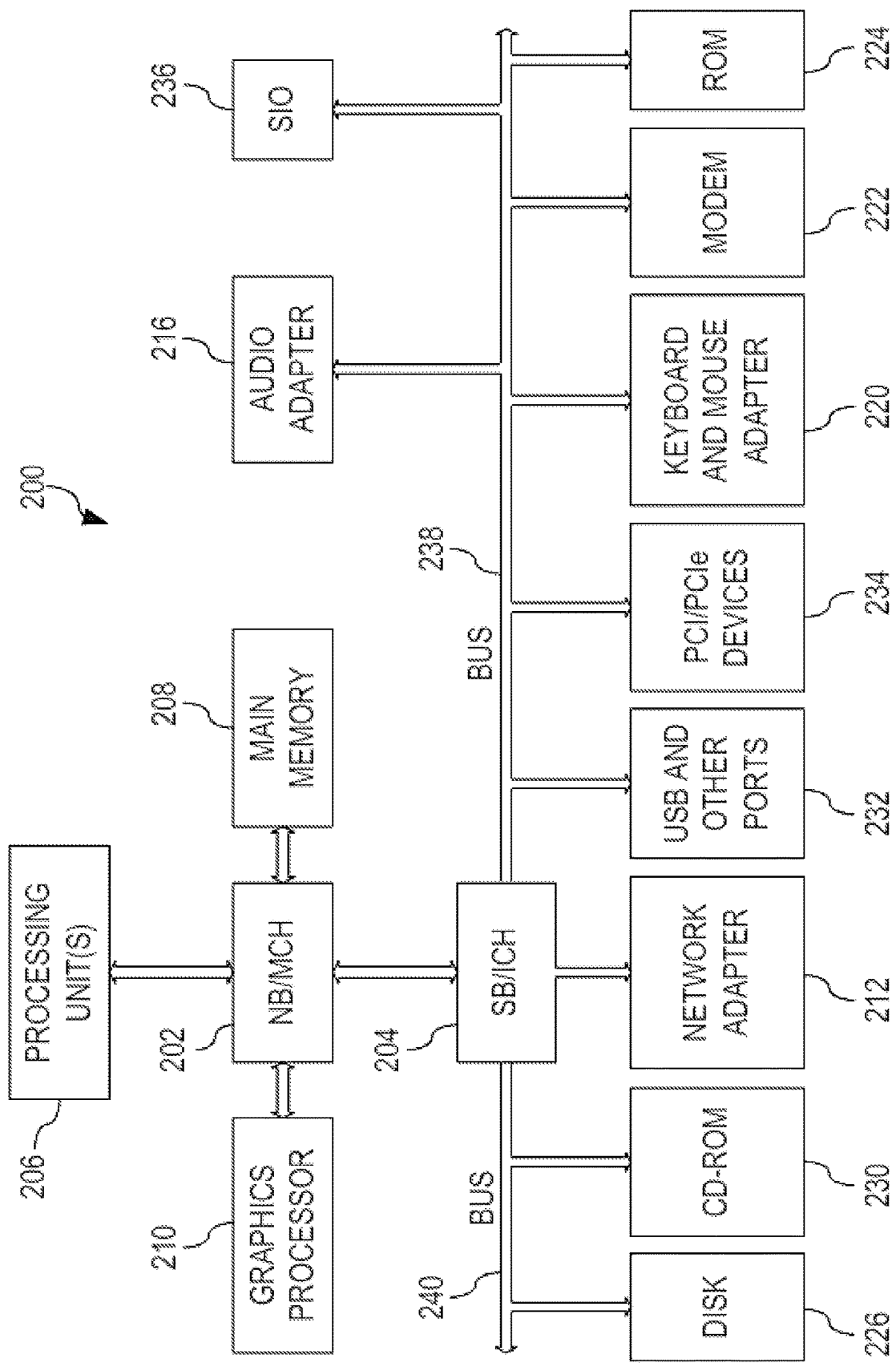
FIG. 2 is a block diagram of an example system in which aspects of the illustrative embodiments may be implemented.

Illustrative embodiments may be utilized in many different types of diagnostic environments. In order to provide a context for the description of elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an exemplary distributed system in which aspects of the illustrative embodiments may be implemented. Distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, a first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System P® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

A proposed concept may enhance computer system diagnostic concepts by facilitating the identification and use of diagnostic tracing context in adapting a level of tracing detail. Embodiments may provide such contextual information in association with stack frames. Put another way, embodiments may generate and/or leverage tracing context information stored in diagnostic trace entries to dynamically alter the level of detail to a given call stack. In this way, the amount of trace may be optimized for cases where tracing a problem causes the problem to no longer occur.

Additionally, such concepts may be used to avoid collecting trace for areas that do not need to be examined in order to resolve the defect. This can vastly reduce an amount of analysis required to diagnose and/or resolve a defect.

Figure 3:
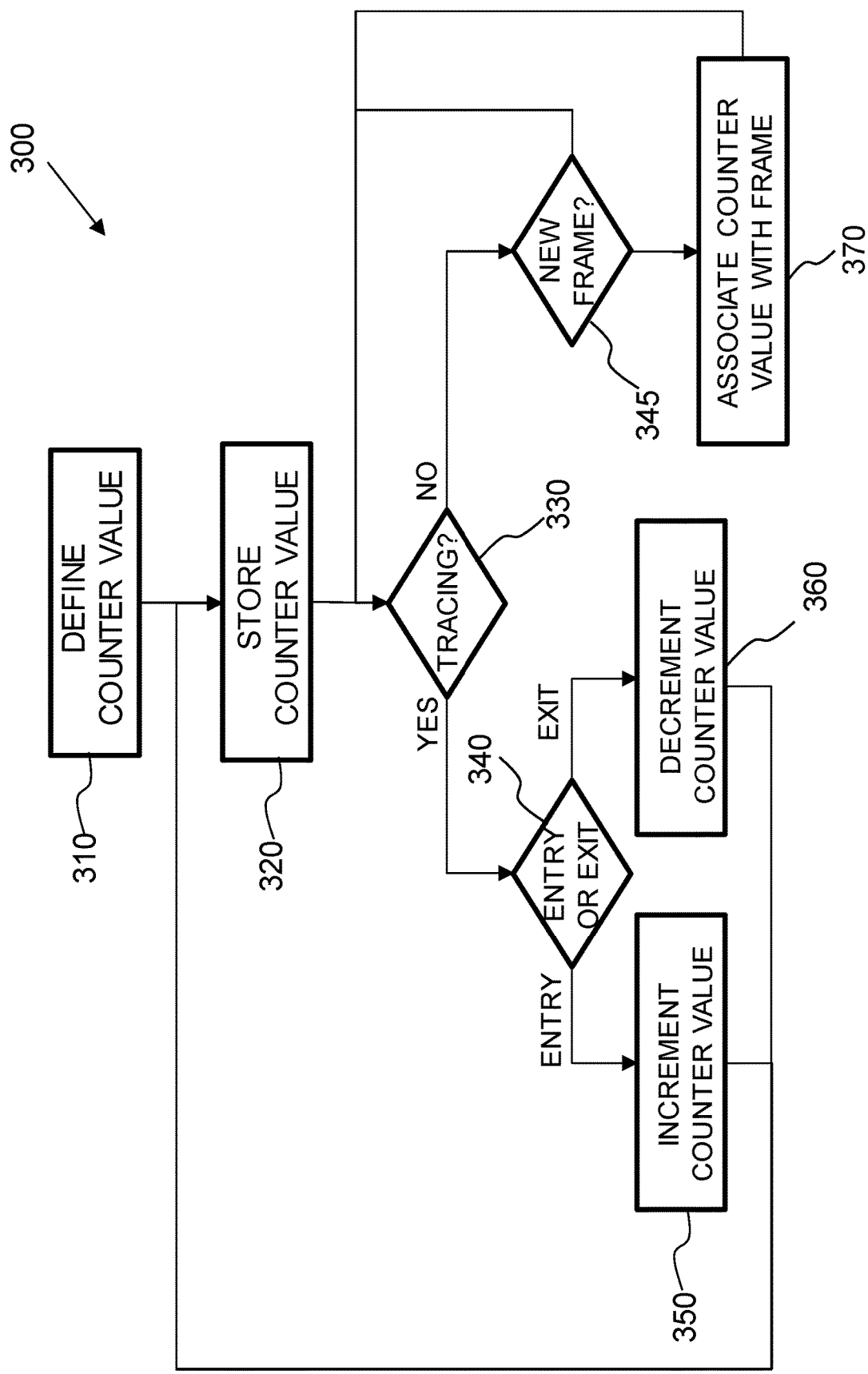
FIG. 3 depicts an exemplary implementation of a method according to an embodiment.

Referring now to FIG. 3, there is depicted an exemplary implementation of a method 300 according to an embodiment. Here, a computer system implements a runtime stack when executing a program. The method begins with the step 310 of defining a counter value. Here, the counter value identifies a level of diagnostic tracing for the runtime stack. By way of example, the counter value may simply comprise an integer value.

In step 320, the counter value is stored in a data storage component. Preferably, the data storage component permits editing (i.e. modification) of the counter value so that it can be changed via execution of the method. However, rather than editing the counter value (e.g. changing a current value of the counter value so that it is overwritten), some embodiments may be configured to store the counter value in a 'log-like' format so that each modification of the counter value generates a new entry for the counter value, thus saving/storing previous value of the counter (in addition to a current value).

The method then proceeds to step 330 wherein monitoring for tracing function is undertaken. If execution of a tracing function is detected, the method proceeds to step 340. Alternatively, if no execution of a tracing function is determined in step 330, the method proceeds to step 345.

In step 340, it is determined if the execution of a tracing function relates to a tracing entry function of a tracing exit function. If it is determined in step 340 that a tracing entry function is invoked, the method proceeds to step 350 wherein the counter value is incremented. If it is determined in step 340 that a tracing exit function is invoked, the method proceeds to step 360 wherein the counter value is decremented. After each of step 350 and step 360, the method returns to step 320 and the new incremented/decremented counter value is stored.

In step 345, it is determined if a new stack frame is being added to the runtime stack. If it is determined in step 345 that no new stack frame is being added to the runtime stack, the method returns back to step 330 wherein monitoring for tracing function is undertaken. If it is determined in step 345 that a new stack frame is being added to the runtime stack, the method proceeds to step 370 wherein the current value of the counter value (stored in the data storage component) is associated with the new stack frame.

It will be appreciated that, as a result of undertaking the method 300 depicted in FIG. 3, each stack frames of the runtime stack will have an associated counter value identifying a level of diagnostic tracing for stack frame.

Figure 4:
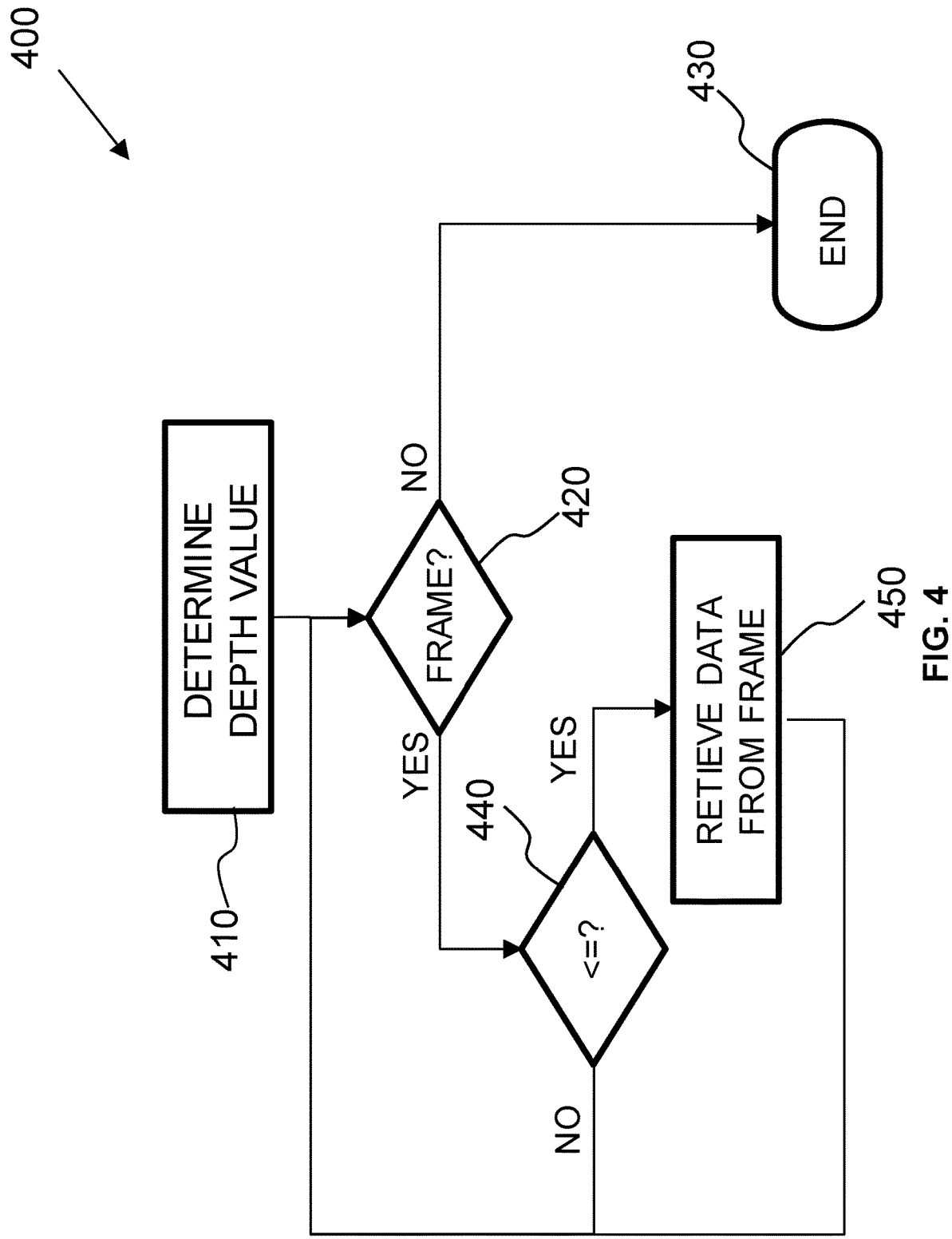
FIG. 4 depicts a flow diagram of an exemplary implementation of a method according to another embodiment.

Referring now to FIG. 4, there is depicted an exemplary implementation of a method 400 for obtaining diagnostic information according to an embodiment. Here, the method leverages diagnostic information logged according to the method of FIG. 3 described above.

The method begins with step 410 of determining a depth value. The depth value identifies a level of diagnostic tracing for the runtime stack, and thus has the same format as a counter value employed in the method 300 of FIG. 3. For instance, the depth value of this example comprises an integer value.

By way of example, the step 410 of determining the diagnostic time window in this example is based on at least one of: a user input; an error message generated by the system; and an expected error or problem.

The method then proceeds to step 420 wherein it is determined if there remain any stack frames to retrieve data from. If it is determined in step 420 that a stack frame remains from which data may (or may not) be retrieved, the method proceeds to step 440.

In step 440, the depth value is compared with a counter value associated with the current stack frame. More specifically, in this example, step 440 determines if the depth value is less than or equal to the counter value associated with the current stack frame. If it is determined in step 440 that the depth value is not less than or equal to the counter value associated with the current stack frame (i.e. the level of diagnostic tracing for the stack frame exceeds the required value identified by the depth value), the current stack frame is dismissed (e.g. removed from further consideration) and the method returns to step 420 (to determine if any further stack frames remain).

Conversely, if it is determined in step 440 that the depth value is less than or equal to the counter value associated with the current stack frame (i.e. the level of diagnostic tracing for the stack frame does not exceed the required value identified by the depth value), data from the current stack frame is retrieved in step 450 and the method then returns to step 420 (to determine if any further stack frames remain).

If it is determined in step 420 that no stack frames remain, the method proceeds to step 430 wherein method stops/end.

Accordingly, it will be appreciated that the embodiment of FIG. 4 can be configured (either by the user, or dynamically by a program) to only retrieve logging information where level of diagnostic tracing for the runtime stack does not exceed a certain value (identified by the depth value).

Proposed embodiments may leverage a trace system implemented in a programming language, such that common trace calls can be added at entry, exit or any other arbitrary point in a method call in any computer programming language. Embodiments of the trace system can use the entry and exit points to maintain a track of the stack depth of the current thread. This could be, for example, by using a thread specific context object such that a counter is incremented on a trace entry call and decremented on a trace exit call.

For example:

```
int myTraceMethod(String arg1, int arg2){
logTraceEntryData(""myTraceMethod", arg1 + "" + arg2;
....program logic....
logTrace("some mid-method trace logging");
..more program logic..
mySecondTraceMethod( );
....more program logic.....
returnValue = 3;
logTraceExitData(returnValue);
}
void mySecondTraceMethod( ){
logTraceEntry("mySecondTraceEntry");
..some program logic..
logTrace("mid-method trace logging 2");
..some more program logic
logTraceExit( );
}
```

Then, executing the myTraceMethod method directly, with the arguments, "test" and 7 might product output in the diagnostic logs similar to the following:

```
[Date/time] { myTraceMethod stackDepth = 1 'test 7'
[Date/time] myTraceMethod stackDepth = 1 'some mid trace logging'
[Date/time] { mySecondTraceEntry stackDepth = 2
[Date/time] mySecondTraceEntry stackDepth = 2 'mid-method trace logging 2'
[Date/time] } mySecondTraceEntry stackDepth = 2
[Date/time] } myTraceMethod stackDepth = 1 3
```

From the example above, it can be seen that when processing enters the trace entry to mySecondMethod( ) the stack depth is increased to 2.

Further, the trace system can be configured, either by the user, or dynamically by the program itself to only output logging information when the depth is less than a certain value. For example if the same code was run with the max stack level (i.e. depth value) set to 1 the output would be:

```
[Date/time] { myTraceMethod stackDepth = 1 'test 7'
[Date/time] myTraceMethod stackDepth = 1 'some mid trace logging'
[Date/time] } myTraceMethod stackDepth = 1 3
```

There should preferably be a way of signaling to the system if a problem has happened, this could either be an automatic trigger (look for an error message in a log, look for a specific trace entry) or an interactive process where the operator runs a command to inform the system that an error has occurred.

In the interactive mode, this command can be scripted to be called from other processes in a case where an error is only detectable by another process (for example, the error is only signaled by invalid data being received by a client).

As an alternative to the interactive command, an implementation may have a callback, or available REST API etc. to allow clients to indicate unexpected errors.

A diagnostic interval is set by the operator to the duration within which the error is expected to occur if trace is disabled.

Proposed concepts may deal with the dynamic switching of the maximum trace stack level in order to maximize the available diagnostic information for a problem which does not occur under full trace. An intended sequence of events are:

i.) A problem occurs in a system with trace completely disabled (typical production configuration)

ii.) During diagnostic activity trace is turned on to full detail, however the error fails to occur iii.) The system is put into "dynamic trace detail mode"

iv.) The resulting log files are sent to an L3 team for analysis.

The dynamic trace detail mode can be described as the following steps.

```
Trace is turned on at full detail
while the problem has not occurred {
run system under trace at current maximum stack level
decrease the maximum stack level by 1
}
```

This procedure will generate the maximum amount of trace while allowing the minimum number of production failures to occur. However, as a drawback, if the defect relies on timing at a low stack level it may take many iterations of the diagnostic interval in order to capture the problem. This may not be a problem in an unattended implementation where the error condition can be detected automatically. However, this may take too long if manual operator intervention is required.

As an alternative the operator could opt for an "aggressive" mode

```
Trace is turned on at minimum detail
while the problem still occurs {
run trace until problem occurs
increase the maximum stack level by 1
}
```

In the case where a problem can be identified by either a specific error message, or a specific trace entry the system can optionally provide further intelligence based on being able to know within what stack the problem has occurred.

In this configuration it is required that errors thrown are able to interact with the log system in order to determine the stack depth and an identifier of all the methods on the current stack.

So, for example, where before the trace entry and exit methods tracked a simple entry/exit status, here they would also maintain a stack of method names. For instance, using the example above when execution was in the method:
  mySecondTraceMethod
The trace context would store the stack:

```
mySecondTraceMethod
myTraceMethod
```

The trace entry method would place the current method name on the top of the stack and the trace exit method would pop an entry from the top of the stack.

When an error is thrown, it can examine the trace context and record the current stack depth and the current stack.

This allows the following two additional dynamic algorithms, in both we assume that the stack depth and stack trace of the error has been recorded when the error first occurs (with the trace system disabled).

The first option tries to maximize the trace around the failure point while minimizing trace from other areas of the product in order to provide less "noise" for diagnostics:

```
while problem still occurs{
run until problem occurs
each trace entry compares the stack recorded on the error, if the stack matches the
trace entry is output,
otherwise it is ignored
increase trace stack level by one
}
```

The second problem does the opposite, for problems with a narrow timing window it produces maximum trace for the rest of the product then incrementally increases the trace level to get the optimal trace level for the failure point, without the problem disappearing.

```
turn on maximum stack depth trace for entries not matching the recorded error
stack
turn on minimum stack depth trace entries matching the recorded error stack while problem still occurs {
run until problem occurs
increase stack level for trace entries matching the recorded error stack
}
```

Both of these variations could be run in inverted mode to obtain an "aggressive" version as described above.

Additionally, in cases where the error condition is indicated by an interactive command, callback or API call, the system can generate a set of stacks for each thread running at the time the call is received and use this set when comparing whether to output trace or not.

Figure 5:
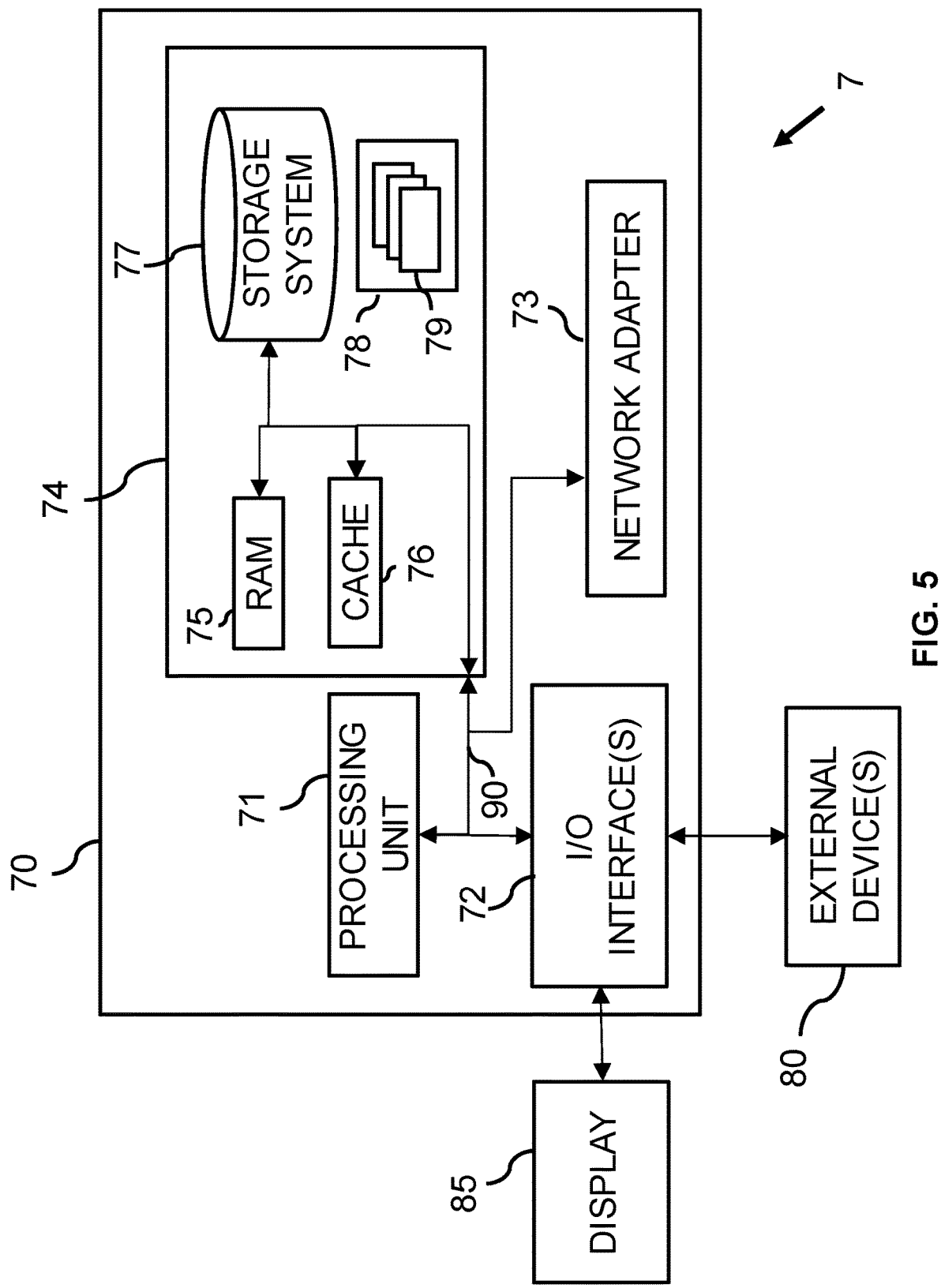
FIG. 5 illustrates a system according to another embodiment.

By way of further example, as illustrated in FIG. 5, embodiments may comprise a computer system 70, which may form part of a networked system 7. The components of computer system/server 70 may include, but are not limited to, one or more processing arrangements, for example comprising processors or processing units 71, a system memory 74, and a bus 90 that couples various system components including system memory 74 to processing unit 71.

Bus 90 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 70 typically includes a variety of computer system readable media. Such media may be any available media that is accessible by computer system/server 70, and it includes both volatile and non-volatile media, removable and non-removable media.

System memory 74 can include computer system readable media in the form of volatile memory, such as random access memory (RAM) 75 and/or cache memory 76. Computer system/server 70 may further include other removable/non-removable, volatile/non-volatile computer system storage media. By way of example only, storage system 74 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 90 by one or more data media interfaces. As will be further depicted and described below, memory 74 may include at least one program product having a set (e.g., at least one) of program modules that are configured to carry out the functions of embodiments of the invention.

Program/utility 78, having a set (at least one) of program modules 79, may be stored in memory 74 by way of example, and not limitation, as well as an operating system, one or more application programs, other program modules, and program data. Each of the operating system, one or more application programs, other program modules, and program data or some combination thereof, may include an implementation of a networking environment. Program modules 79 generally carry out the functions and/or methodologies of embodiments of the invention as described herein.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73. As depicted, network adapter 73 communicates with the other components of computer system/server 70 via bus 90. It should be understood that although not shown, other hardware and/or software components could be used in conjunction with computer system/server 70. Examples, include, but are not limited to: microcode, device drivers, redundant processing units, external disk drive arrays, RAID systems, tape drives, and data archival storage systems, etc.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for obtaining diagnostic information relating to a computer system that implements a runtime stack when executing a program, the method comprising:
   determining a depth value, wherein the depth value identifies a level of diagnostic tracing for the runtime stack; and
   for at least one stack frame of the runtime stack: comparing the depth value with a counter value associated with the stack frame, wherein the counter value is associated with a new stack frame in response to the new stack frame being added to the runtime stack; and
   retrieving data from the stack frame based on the comparison result.

2. The method of claim 1, wherein the counter value is incremented when a tracing entry function is invoked, and decremented when a tracing exit function is invoked.

3. The method of claim 1, wherein determining a depth value comprises:
   determining, for the runtime stack, a largest value of a counter value associated a stack frame of the runtime stack;
   defining the depth value to be equal to the determined largest value of a counter value;
   executing a tracing function on the computer system; and
   in response to no error or problem occurring within a diagnostic time window during execution of the tracing function, decrementing the depth value.

4. The method of claim 1, wherein determining a depth value comprises:
   determining, for the runtime stack, a smallest value of a counter value associated a stack frame of the runtime stack;
   defining the depth value to be equal to the determined smallest value of a counter value;
   executing a tracing function on the computer system; and
   in response to an error or problem occurring within a diagnostic time window during execution of the tracing function, incrementing the depth value.

5. The method of claim 1, further comprising:
   in response to an error or problem occurring during execution of a program, comparing a tracing entry function with an identifier of a tracing function at the top of a tracing stack associated with the runtime stack; and
   retrieving data from the stack frame based on the result of the comparing.

6. The method of claim 5, wherein retrieving data from the stack frame based on the result of comparing comprises:
   if the tracing entry function matches an identifier of a tracing function at the top of a tracing stack associated with the runtime stack, retrieving data from the stack frame; and
   if the tracing entry function does not match an identifier of a tracing function at the top of a tracing stack associated with the runtime stack, incrementing the depth value.

7. A system for obtaining diagnostic information relating to a computer system that implements a runtime stack when executing a program, the system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
- determining a depth value, the depth value being configured to identify a level of diagnostic tracing for the runtime stack;
- for at least one stack frame of the runtime stack, comparing the depth value with a counter value associated with the stack frame, wherein the counter value is associated with a new stack frame in response to the new stack frame being added to the runtime stack; and retrieving data from the stack frame based on the comparison result.

8. The system of claim 7, wherein the counter value is incremented when a tracing entry function is invoked, and decremented when a tracing exit function is invoked.

9. The system of claim 7, wherein determining a depth value comprises:
- determining, for the runtime stack, a largest value of a counter value associated a stack frame of the runtime stack;
- defining the depth value to be equal to the determined largest value of a counter value;
- executing a tracing function on the computer system; and
- in response to no error or problem occurring within a diagnostic time window during execution of the tracing function, decrementing the depth value.

10. The system of claim 7, wherein determining a depth value comprises:
- determining, for the runtime stack, a smallest value of a counter value associated a stack frame of the runtime stack;
- defining the depth value to be equal to the determined smallest value of a counter value;
- executing a tracing function on the computer system; and
- in response to an error or problem occurring within a diagnostic time window during execution of the tracing function, incrementing the depth value.

11. The system of claim 7, further comprising:
- in response to an error or problem occurring during execution of a program, comparing a tracing entry function with an identifier of a tracing function at the top of a tracing stack associated with the runtime stack; and
- retrieving data from the stack frame based on the result of the comparing.

12. The system of claim 11, wherein retrieving data from the stack frame based on the result of comparing comprises:
- if the tracing entry function matches an identifier of a tracing function at the top of a tracing stack associated with the runtime stack, retrieving data from the stack frame; and
- if the tracing entry function does not match an identifier of a tracing function at the top of a tracing stack associated with the runtime stack, incrementing the depth value.

13. A computer program product for obtaining diagnostic information relating to a computer system that implements a runtime stack when executing a program, the computer program product comprising a computer readable non-transitory tangible storage medium having program instructions embodied therewith, the program instructions executable by a processing unit to cause the processing unit to perform a method comprising:
- determining a depth value, the depth value being configured to identify a level of diagnostic tracing for the runtime stack;
- for at least one stack frame of the runtime stack, comparing the depth value with a counter value associated with the stack frame, wherein the counter value is associated with a new stack frame in response to the new stack frame being added to the runtime stack; and
- retrieving data from the stack frame based on the comparison result.

14. The computer program product of claim 13, wherein the counter value is incremented when a tracing entry function is invoked, and decremented when a tracing exit function is invoked.

15. The computer program product of claim 13, wherein determining a depth value comprises:
- determining, for the runtime stack, a largest value of a counter value associated a stack frame of the runtime stack;
- defining the depth value to be equal to the determined largest value of a counter value;
- executing a tracing function on the computer system; and
- in response to no error or problem occurring within a diagnostic time window during execution of the tracing function, decrementing the depth value.

16. The computer program product of claim 13, wherein determining a depth value comprises:
- determining, for the runtime stack, a smallest value of a counter value associated a stack frame of the runtime stack;
- defining the depth value to be equal to the determined smallest value of a counter value;
- executing a tracing function on the computer system; and
- in response to an error or problem occurring within a diagnostic time window during execution of the tracing function, incrementing the depth value.

17. The computer program product of claim 13, further comprising:
- in response to an error or problem occurring during execution of a program, comparing a tracing entry function with an identifier of a tracing function at the top of a tracing stack associated with the runtime stack; and
- retrieving data from the stack frame based on the result of the comparing.

* * * * *